(12) United States Patent
Virgin

(10) Patent No.: US 9,102,276 B1
(45) Date of Patent: Aug. 11, 2015

(54) BAG HOLDING APPARATUS

(71) Applicant: Sheila M. Virgin, Manhattan Beach, CA (US)

(72) Inventor: Sheila M. Virgin, Manhattan Beach, CA (US)

( * ) Notice: Subject to any disclaimer, the term of this patent is extended or adjusted under 35 U.S.C. 154(b) by 79 days.

(21) Appl. No.: 14/053,136

(22) Filed: Oct. 14, 2013

(51) Int. Cl.
*B60R 7/04* (2006.01)
*B60R 7/08* (2006.01)
*B60R 7/12* (2006.01)
*B60R 7/10* (2006.01)
*B60R 11/00* (2006.01)
*B60R 7/00* (2006.01)

(52) U.S. Cl.
CPC ................ *B60R 7/043* (2013.01); *B60R 7/005* (2013.01); *B60R 7/08* (2013.01); *B60R 7/10* (2013.01); *B60R 7/12* (2013.01); *B60R 2011/0017* (2013.01)

(58) Field of Classification Search
CPC ............... B60R 2011/0012; B60R 2011/0017; B60R 7/043; B60R 7/005; B60R 7/08; B60R 7/10
See application file for complete search history.

(56) References Cited

U.S. PATENT DOCUMENTS

| | | | |
|---|---|---|---|
| 1,856,847 A | 5/1932 | Gates | |
| 2,565,719 A | 8/1951 | Church | |
| 4,068,817 A * | 1/1978 | Berger | 248/340 |
| 4,113,156 A * | 9/1978 | Brito | 224/666 |
| 4,464,813 A * | 8/1984 | Bakker et al. | 24/601.1 |
| 4,561,685 A * | 12/1985 | Fischer | 293/128 |
| D297,074 S | 8/1988 | Burke et al. | |
| 4,974,764 A * | 12/1990 | Cantwell | 224/269 |
| 4,978,093 A | 12/1990 | Kennedy | |
| D314,864 S | 2/1991 | Creed | |
| 5,094,417 A | 3/1992 | Creed | |
| 5,224,247 A * | 7/1993 | Collier | 24/587.12 |
| 5,433,359 A * | 7/1995 | Flowers | 224/222 |
| 5,983,686 A * | 11/1999 | Lee | 70/456 R |
| 6,131,780 A * | 10/2000 | Becker | 224/148.6 |
| 6,832,711 B2 * | 12/2004 | Black | 224/628 |
| 6,837,472 B1 * | 1/2005 | Beutz | 248/312 |
| 6,863,249 B1 * | 3/2005 | Alvord | 248/95 |
| 6,896,164 B2 | 5/2005 | Fialla-Dori | |
| D599,188 S | 9/2009 | Ingalsbe et al. | |
| 2004/0035899 A1* | 2/2004 | Reynolds | 224/585 |
| 2004/0200940 A1 | 10/2004 | Pacheco | |
| 2008/0231063 A1 | 9/2008 | Bowers | |
| 2008/0296325 A1* | 12/2008 | Tepper | 224/148.6 |
| 2013/0270316 A1* | 10/2013 | Angara | 224/510 |

* cited by examiner

*Primary Examiner* — Brian D Nash

(57) ABSTRACT

A bag holding apparatus supports a bag from a headrest post of a vehicle seat. The apparatus includes a strap having a top end and a bottom end. A coupler is attached to the strap proximate the top end. The coupler is configured for supporting the strap from a headrest post of a vehicle seat. A support member is attached to the strap proximate the bottom end. The support member is configured for supporting a bag therefrom.

17 Claims, 3 Drawing Sheets

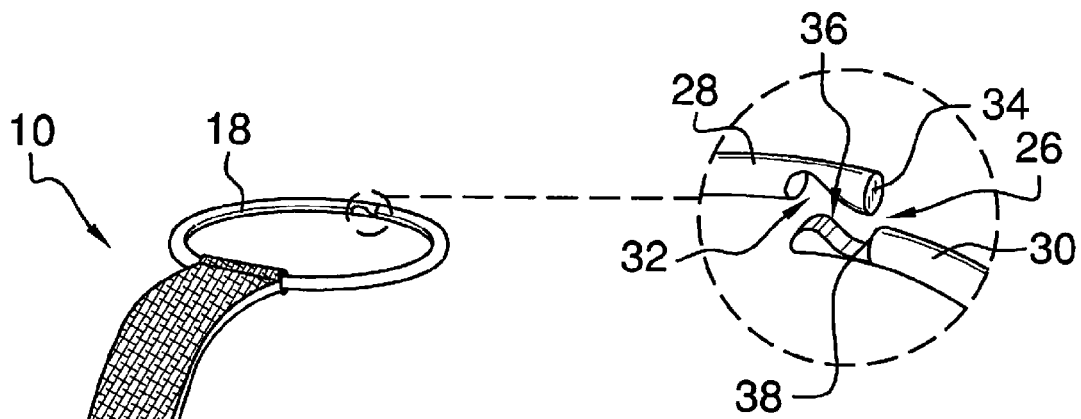
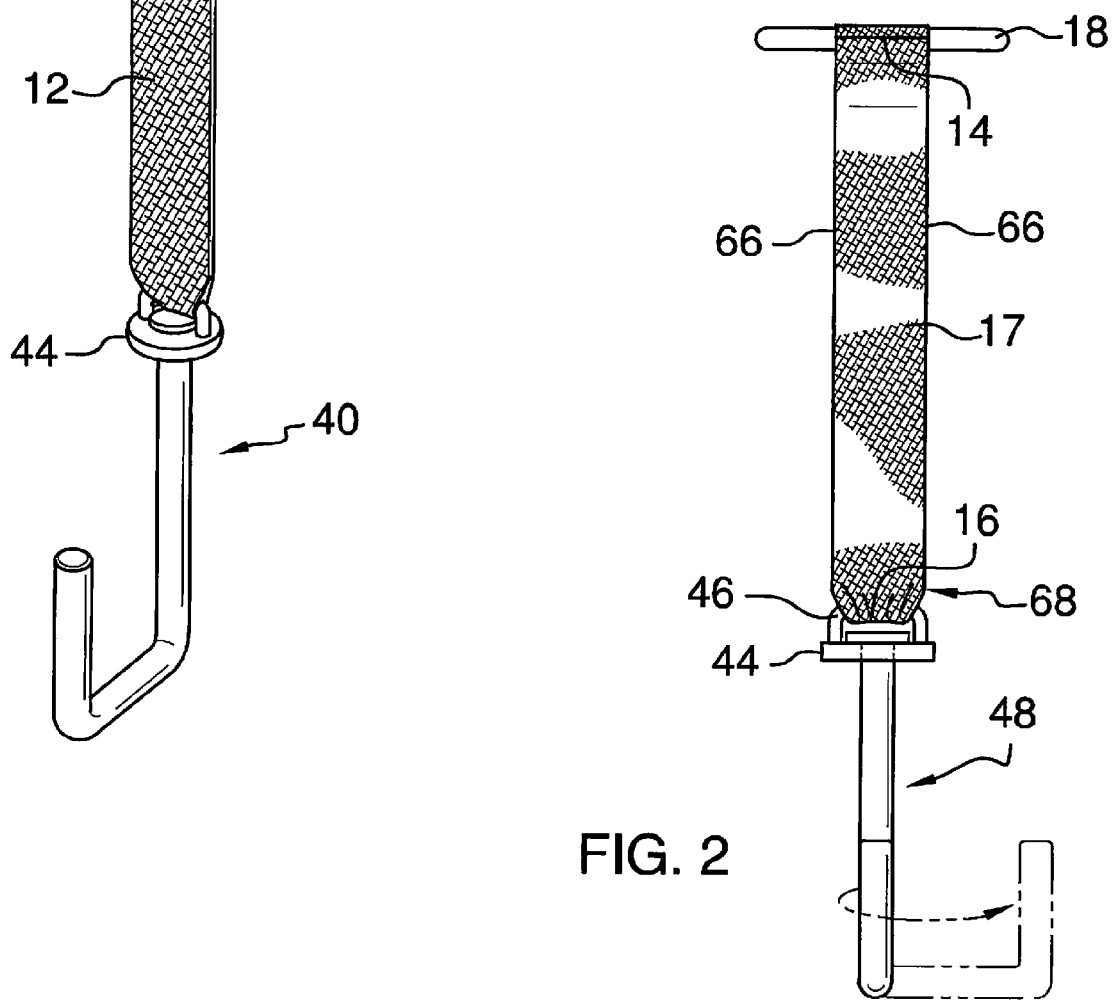
FIG. 1
FIG. 2

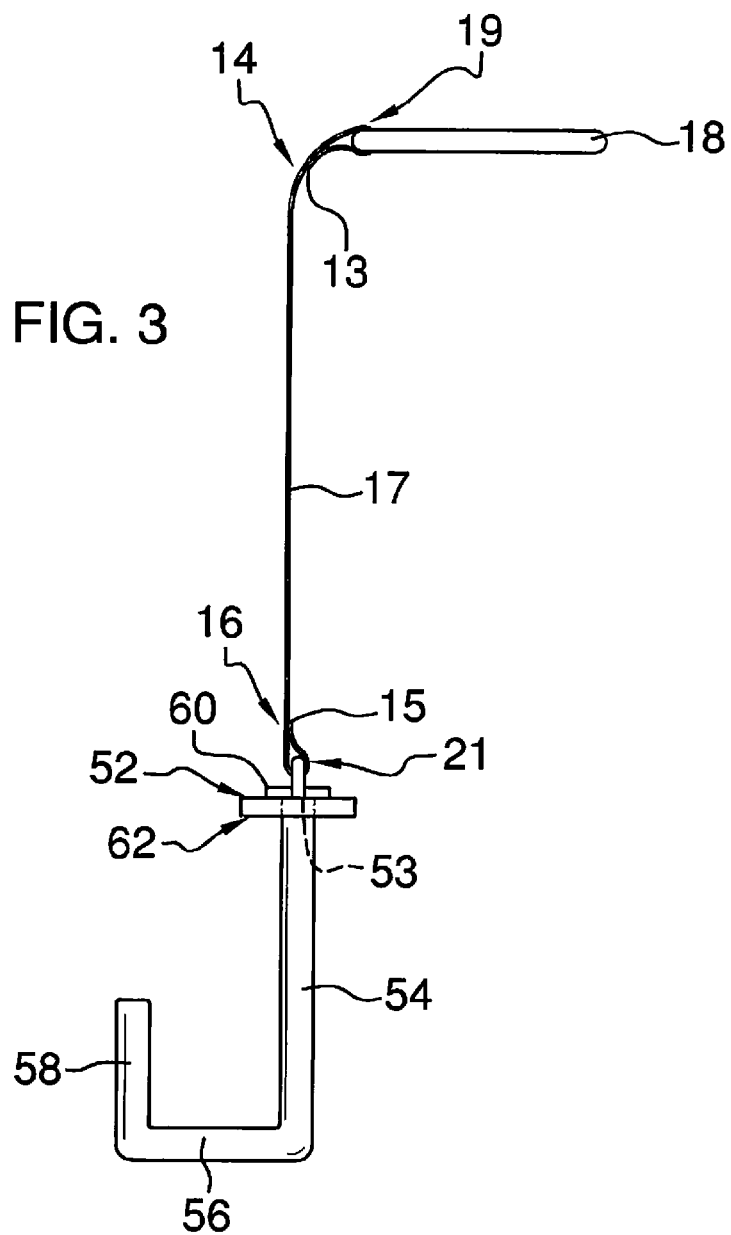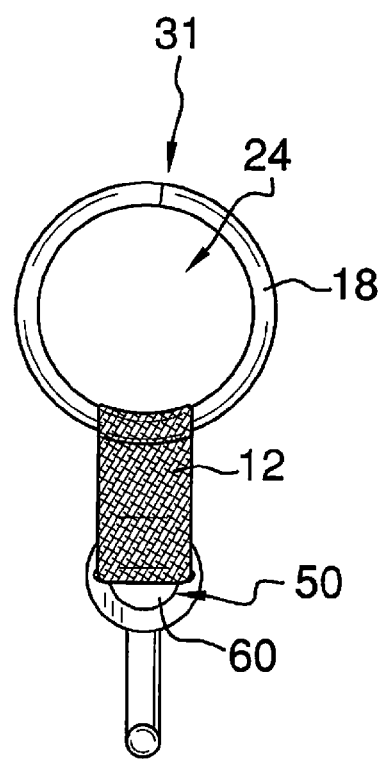

BAG HOLDING APPARATUS

BACKGROUND OF THE DISCLOSURE

Field of the Disclosure

The disclosure relates to holding devices and more particularly pertains to a new holding device for supporting a bag from a headrest post of a vehicle seat.

SUMMARY OF THE DISCLOSURE

An embodiment of the disclosure meets the needs presented above by generally comprising a strap having a top end and a bottom end. A coupler is attached to the strap proximate the top end. The coupler is configured for supporting the strap from a headrest post of a vehicle seat. A support member is attached to the strap proximate the bottom end. The support member is configured for supporting a bag therefrom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top front side perspective view of a bag holding apparatus according to an embodiment of the disclosure.

FIG. 2 is a front view of an embodiment of the disclosure.

FIG. 3 is a side view of an embodiment of the disclosure.

FIG. 4 is a top view of an embodiment of the disclosure.

DESCRIPTION OF THE PREFERRED EMBODIMENT

Figure 5:
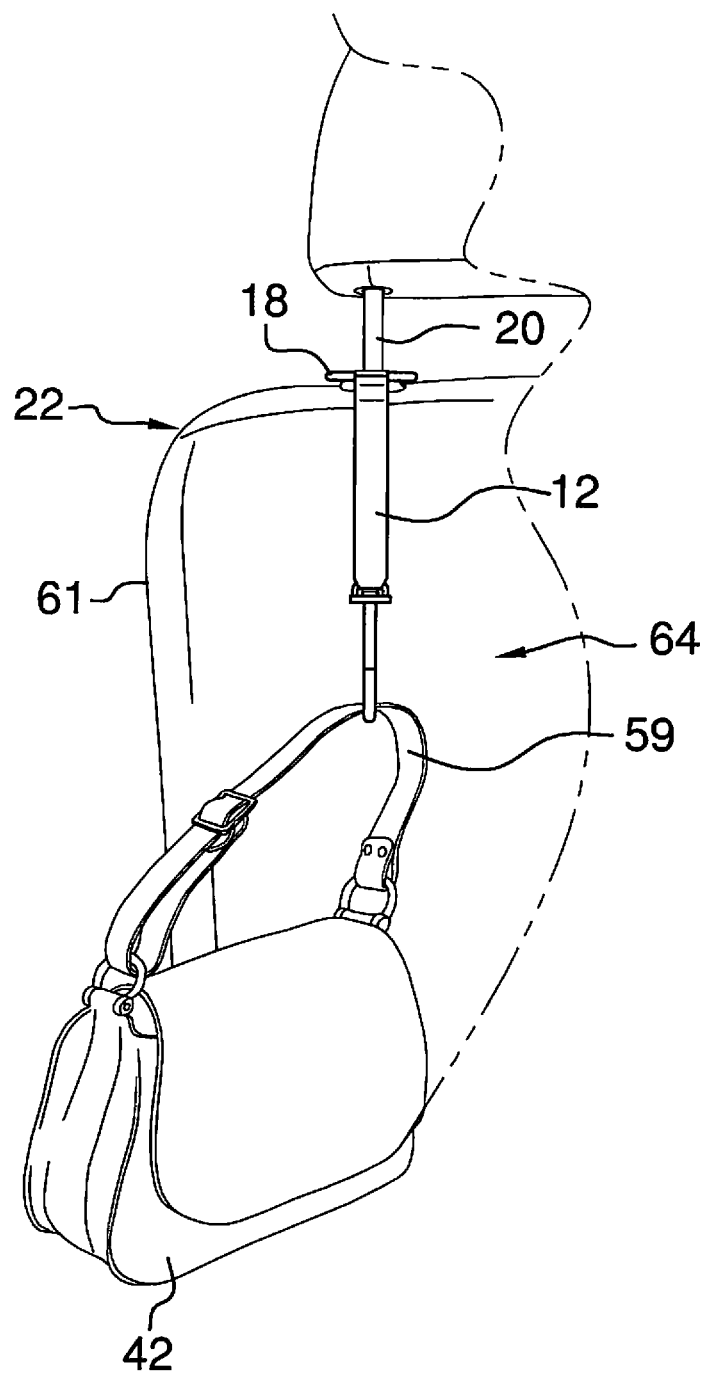
FIG. 5 is an-use view of an embodiment of the disclosure.

With reference now to the drawings, and in particular to FIGS. 1 through 5 thereof, a new holding device embodying the principles and concepts of an embodiment of the disclosure and generally designated by the reference numeral 10 will be described.

As best illustrated in FIGS. 1 through 5, the bag holding apparatus 10 generally comprises a strap 12 having a top end 14, a bottom end 16 and a medial portion 17 extending between the top 14 and bottom 16 ends. The strap 10 is elongated and constructed from a flexible material, such as nylon or the like. Lateral sides 66 of the strap 12 may include a tapered portion 68 positioned proximate the bottom end 16 that tapers inwardly toward the bottom end 16. An upper loop 19 and a lower loop 21 are each coupled to the strap 12. The upper loop 19 is positioned proximate the top end 14 and has an outer end edge 13. The lower loop 21 is positioned proximate the bottom end 16 and has an outer end edge 15.

A coupler 18 is attached to the strap 12 proximate the top end 14. In particular, the coupler 18 extends through the upper loop 19 wherein the coupler 18 is attached to the strap 12. The coupler 18 is configured for supporting the strap 12 from a headrest post 20 of a vehicle seat 22. The coupler 18 is preferably attached to the passenger side vehicle seat 22, though it should be understood that the coupler 18 may be attached to any headrest post 20 within a vehicle. The outer end edge 13 of the upper loop 19 may be coupled to the top end 14 of the strap 12. The coupler 18 has a centrally disposed opening 24 wherein the opening 24 is configured to receive the headrest post 20. The coupler 18 may be annular.

The coupler 18 has a break 26 therein providing access to the opening 24. The break 26 defines first 28 and second 30 coupler portions of the coupler 18. The coupler 18 is constructed from plastic or like material that generally biases the coupler 18 into a closed configuration 31. The first 28 and second 30 coupler portions are coupled together when the coupler 18 is positioned in the closed configuration 31. The coupler 18 allows the first 28 and second 30 coupler portions to be moved away from each other to position the coupler so that it extends around the headrest post 20. An indentation 32 extends into the first coupler portion 28. The indentation 32 may be positioned proximate an end edge 34 of the first coupler portion 28. A protrusion 36 extends outwardly from the second coupler portion 30. The protrusion 36 may be positioned proximate an end edge 38 of the second coupler portion 30. The protrusion 36 has a size and shape complementary to the indentation 32 wherein the protrusion 36 is selectively positionable within the indentation 32 to clasp the first 28 and second 30 coupler portions together.

A support member 40 is attached to strap 12 proximate the bottom end 16 of the strap 12. The support member 40 is configured for supporting a bag 42, such as a purse, grocery bag or the like, therefrom. The support member 40 may be constructed from plastic or similar material. The support member 40 includes a plate 44, a connector 46 and a rigid hook 48. The plate 44 may be annular. The plate 44 has an aperture 50 positioned therein. The connector 46 is coupled to and extends upwardly from a top surface 52 of the plate 44. The connector 46 may be arcuate. The connector 46 is coupled to the bottom end 16 of the strap 12. In particular, the connector 46 extends through the lower loop 21 wherein the support member 40 is coupled to the strap 12. The outer end edge 15 of the lower loop 21 may be coupled to the bottom end 16 of the strap 12.

The hook 48 has a first section 54, a second section 56 and a third section 58. The second section 56 extends between the first 54 and third 58 sections. The second section 56 is configured to receive one or more straps 59 of the bag 42 for supporting the bag 42 on the hook 48. The first section 54 is coupled to and extends downwardly from a bottom surface 62 of the plate 44. The first section 54 and the third section 58 are positioned in spaced parallel relationship relative to each other. The second section 56 is positioned transverse relative to the first section 54 and the third section 58.

A head 60 is coupled to the first section 54 of the hook 40 at an upper edge 53 of the first section 54. The head 60 extends through the aperture 50. The head 60 has a greater width than the aperture 50 so that the head 60 retains the hook 48 within the aperture 50. The head 60 is slidable within the aperture 50 such that the hook 48 is swivelable relative to the plate 44. In this manner, the hook 48 can be positioned adjacent a side 61 of the vehicle seat 22 or swiveled so that the hook 48 is adjacent a back side 64 of the vehicle seat 22. Thus, the hook 48 can be positioned over the console, behind the vehicle seat 22 or at a location somewhere in between. This allows the bag 42, which is suspended from the hook 48, to be positioned in a selectable location that is convenient to the user. The strap 12 generally remains stationary against the vehicle seat 22 when the hook 48 is swiveled in order to prevent twisting of the strap 12.

The coupler 18 may have a diameter between approximately 1.25 centimeters and 5.10 centimeters. The apparatus 10 may have a length between approximately 12.0 centimeters and 20.0 centimeters; a height between approximately 15.0 centimeters and 25.0 centimeters; and a width between approximately 1.0 centimeter and 5.0 centimeters.

In use, as stated above and shown in the Figures, the coupler 18 is attached to the headrest post 20 of the vehicle seat 22, preferably on the passenger side vehicle seat 22. In particular, the first 28 and second 30 coupler portions are pulled apart to position headrest post 20 in the opening 24. Force is then removed so that the coupler 18 is allowed to close around the headrest post 20. A bag 42, such as a purse, grocery bag or the like, is suspended from the hook 48 and spaced above the ground surface of the vehicle. The hook 48 can be swiveled to a selectable location relative to the plate 44 so that the bag 42 can be positioned in a desired location. In this manner, the apparatus 10 ensures that the contents of the bag 42 are readily accessible to the driver while driving. The apparatus 10 also prevents the contents of the bag 42 from spilling by securely holding the bag 42 in an upright position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A bag holding apparatus comprising:
   a strap having a top end and a bottom end;
   a coupler attached to said strap proximate said top end, said coupler being configured for supporting said strap from a headrest post of a vehicle seat;
   a support member attached to said strap proximate said bottom end, said support member being configured for supporting a bag therefrom, said support member including a plate, said support member including a connector being coupled to said plate and said bottom end of said strap, said support member including a rigid hook coupled to said plate and
   wherein said hook includes a first section, a second section and a third section, said second section extending between said first section and said third section, a distal end of said third section relative to said second section defining a free end in spaced relationship to said first section forming an unobstructed opening into said hook such that said second section is configured to support straps of the bag on said hook, said first section and said third section being positioned in spaced parallel relationship relative to each other, each of said first section, said second section, and said third section being straight and coplanar.

2. The apparatus of claim 1, further comprising said strap including a tapered portion positioned proximate said bottom end, said tapered section tapering inwardly toward said bottom end.

3. The apparatus of claim 1, further comprising said coupler having a centrally disposed opening configured to receive the headrest post, said coupler having a break therein to provide access to said opening.

4. The apparatus of claim 3, further comprising said break defining first and second coupler portions, said first and second coupler portions being movable relative to each other.

5. The apparatus of claim 4, further comprising said coupler being biased into a closed configuration, said first and second coupler portions being coupled together when said coupler is positioned in said closed configuration.

6. The apparatus of claim 4, further comprising:
   an indentation extending into said first coupler portion; and
   a protrusion extending outwardly from said second coupler portion, said protrusion having a size and shape complementary to said indentation wherein said protrusion is selectively positionable within said indentation to couple said first and second coupler portions together.

7. The apparatus of claim 6, further comprising:
   said indentation being positioned proximate an end edge of said first coupler portion; and
   said protrusion being positioned proximate an end edge of said second coupler portion.

8. The apparatus of claim 1, further comprising an upper loop coupled to said strap positioned proximate said top end, said coupler extending through said upper loop wherein said coupler is attached to said strap.

9. The apparatus of claim 8, further comprising an outer end edge of said upper loop being coupled to said top end of said strap.

10. The apparatus of claim 1, further comprising said connector being coupled to and extending upwardly from a top surface of said plate, said first section of said hook extending downwardly from a bottom surface of said plate.

11. The apparatus of claim 1, further comprising a lower loop coupled to said strap proximate said bottom end, said connector extending through said lower loop wherein said support member is coupled to said strap.

12. The apparatus of claim 11, further comprising an outer end edge of said lower loop being coupled to said bottom end of said strap.

13. The apparatus of claim 1, further comprising said second section being positioned transverse relative to said first section and said third section.

14. The apparatus of claim 1, further comprising:
   said plate having an aperture positioned therein; and
   a head being coupled to said first section of said hook at an upper edge of said first section, said head extending through said aperture, said head having a greater width than said aperture such that said head retains said hook within said aperture.

15. The apparatus of claim 14, further comprising said head being slidable within said aperture such that said hook swivels relative to said plate.

16. The apparatus of claim 1, further comprising said first section being coupled to and extending downwardly from a bottom surface of said plate.

17. A bag holding apparatus comprising:
   a strap having a top end, a bottom end and a medial portion extending between said top and bottom ends, said strap being elongated, said strap including a tapered portion positioned proximate said bottom end, said tapered section tapering inwardly toward said bottom end, said strap being flexible;

a coupler attached to said strap proximate said top end, said coupler being configured for supporting said strap from a headrest post of a vehicle seat, said coupler having a centrally disposed opening wherein said opening is configured to receive the headrest post, said coupler having a break therein to provide access to said opening, said break defining first and second coupler portions, said first and second coupler portions being movable relative to each other, said coupler being biased into a closed configuration, said first and second coupler portions being coupled together when said coupler is positioned in said closed configuration, said coupler being annular;

an indentation extending into said first coupler portion, said indentation being positioned proximate an end edge of said first coupler portion;

a protrusion extending outwardly from said second coupler portion, said protrusion being positioned proximate an end edge of said second coupler portion, said protrusion having a size and shape complementary to said indentation wherein said protrusion is selectively positionable within said indentation to couple said first and second coupler portions together;

an upper loop coupled to said strap proximate said top end, said coupler extending through said upper loop wherein said coupler is attached to said strap, an outer end edge of said upper loop being coupled to said top end of said strap;

a support member attached to said strap proximate said bottom end, said support member being configured for supporting a bag therefrom, said support member including;

a plate, said plate being annular, said plate having an aperture positioned therein;

a connector, said connector being coupled to said bottom end of said strap, said connector being coupled to and extending upwardly from a top surface of said plate, said connector being arcuate;

a rigid hook coupled to said plate, said hook having a first section, a second section and a third section, said second section extending between said first section and said third section, a distal end of said third section relative to said second section defining a free end in spaced relationship to said first section forming an unobstructed opening into said hook such that said second section is configured to support straps of the bag on said hook, said first section and said third section being positioned in spaced parallel relationship relative to each other, each of said first section, said second section, and said third section being straight and coplanar, said first section being coupled to and extending downwardly from a bottom surface of said plate, said first section and said third section being positioned in spaced parallel relationship relative to each other, said second section being positioned transverse relative to said first section and said third section; and a head being coupled to said first section of said hook at an upper edge of said first section, said head extending through said aperture, said head having a greater width than said aperture such that said head retains said hook within said aperture, said head being slidable within said aperture such that said hook swivels relative to said plate; and a lower loop coupled to said strap proximate said bottom end, said connector extending through said lower loop wherein said support member is coupled to said strap, an outer end edge of said lower loop being coupled to said bottom end of said strap.

\* \* \* \* \*